(12) United States Patent
Van De Pol et al.

(10) Patent No.: US 11,218,745 B2
(45) Date of Patent: **\*Jan. 4, 2022**

(54) SYSTEMS AND METHODS FOR MEDIA PACKAGING

(71) Applicant: TIVO CORPORATION, San Jose, CA (US)

(72) Inventors: Erik Van De Pol, South Orange, NJ (US); See Wing Mak, Westbury, NY (US); Alex Jansen, Jersey City, NJ (US); Gerrit Niemeijer, Maplewood, NJ (US); Seth Haberman, New York, NY (US)

(73) Assignee: TIVO CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,196

(22) Filed: Jun. 29, 2020

(65) Prior Publication Data

US 2021/0021881 A1 Jan. 21, 2021

Related U.S. Application Data

(63) Continuation of application No. 15/820,733, filed on Nov. 22, 2017, now Pat. No. 10,735,788, which is a
(Continued)

(51) Int. Cl.
*H04N 7/10* (2006.01)
*H04N 21/2368* (2011.01)
(Continued)

(52) U.S. Cl.
CPC ........ *H04N 21/2368* (2013.01); *H04H 20/28* (2013.01); *H04N 21/235* (2013.01);
(Continued)

(58) Field of Classification Search
CPC .. H04N 21/2368; H04N 21/235; H04N 20/28; H04N 21/4532; H04N 21/84;
(Continued)

(56) References Cited

U.S. PATENT DOCUMENTS

| 5,600,364 A | 2/1997 | Hendricks et al. |
| 6,002,393 A | 12/1999 | Hite et al. |

(Continued)

FOREIGN PATENT DOCUMENTS

| JP | 08-171374 | 7/1996 |
| JP | 2000-078559 A | 3/2000 |

(Continued)

OTHER PUBLICATIONS

T. Ando et al.,, One Consideration on SYstem for Providing Interactive Multimedia Contents Based on Dynamic Scenario Expansion, Aug. 29, 2001, IEICE Transactions on Information and System Society, IEICE, 196.

(Continued)

*Primary Examiner* — Jefferey F Harold
*Assistant Examiner* — Sahar Aqil Riaz
(74) *Attorney, Agent, or Firm* — Haley Guiliano LLP

(57) ABSTRACT

The invention relates to a method for packaging media and data for transmission over a broadband communications network link for display at a terminal destination. Features of the method included creating desired media segments for transmission to the terminal destination and for creating targeting information, for example in whole or in part in the form of metadata, for transmission to the terminal destination. Other features include packaging the created media segments and the created targeting information in a single package and unpacking the single package for display of the targeted media at the terminal destination. In another aspect, the invention can provide a method for unpacking media and (Continued)

data for display at a terminal destination implementing, at the terminal destination, receiving a single package containing media segments and instructions regarding handling of the media segments, quickly unpacking the media segments and the instructions from the single package and, based on the unpacked instructions, assembling one or more of the media segments for display at the terminal destination.

19 Claims, 7 Drawing Sheets

Related U.S. Application Data continuation of application No. 14/217,167, filed on Mar. 17, 2014, now Pat. No. 9,854,281, which is a continuation of application No. 12/235,556, filed on Sep. 22, 2008, now Pat. No. 8,677,397.

(60) Provisional application No. 60/973,982, filed on Sep. 20, 2007.

(51) Int. Cl.

| | |
|---|---|
| *H04H 20/28* | (2008.01) |
| *H04N 21/45* | (2011.01) |
| *H04N 21/84* | (2011.01) |
| *H04N 21/845* | (2011.01) |
| *H04N 21/854* | (2011.01) |
| *H04N 21/8541* | (2011.01) |
| *H04N 21/81* | (2011.01) |
| *H04N 21/235* | (2011.01) |
| *H04N 21/2668* | (2011.01) |
| *H04N 21/234* | (2011.01) |
| *H04H 60/73* | (2008.01) |

(52) U.S. Cl.
CPC ....... *H04N 21/4532* (2013.01); *H04N 21/812* (2013.01); *H04N 21/84* (2013.01); *H04N 21/8456* (2013.01); *H04N 21/8541* (2013.01); *H04N 21/85406* (2013.01); *H04H 60/73* (2013.01); *H04N 21/23424* (2013.01); *H04N 21/2668* (2013.01)

(58) Field of Classification Search
CPC ......... H04N 21/8456; H04N 21/85406; H04N 21/8541; H04N 21/812; H04N 21/2668; H04N 21/23424; H04H 60/73
USPC .......................................................... 725/34
See application file for complete search history.

(56) References Cited

U.S. PATENT DOCUMENTS

| | | | |
|---|---|---|---|
| 6,088,710 A | 7/2000 | Dreyer et al. | |
| 6,675,387 B1 | 1/2004 | Boucher et al. | |
| 7,080,392 B1 | 7/2006 | Geshwind | |
| 7,328,231 B2 | 2/2008 | LaCroix et al. | |
| 8,677,397 B2 | 3/2014 | Van et al. | |
| 8,984,575 B2* | 3/2015 | Frey | H04L 65/602 |
| | | | 725/116 |
| 9,264,750 B2* | 2/2016 | Mathews | H04N 21/812 |
| 9,854,281 B2 | 12/2017 | Van et al. | |
| 2001/0051964 A1 | 12/2001 | Warmus et al. | |
| 2001/0056489 A1 | 12/2001 | Ariga | |
| 2002/0013943 A1 | 1/2002 | Haberman et al. | |
| 2002/0087580 A1 | 7/2002 | LaCroix et al. | |
| 2002/0092019 A1 | 7/2002 | Marcus | |
| 2002/0174439 A1 | 11/2002 | Akiyama et al. | |
| 2002/0194589 A1 | 12/2002 | Cristofalo et al. | |
| 2002/0199148 A1 | 12/2002 | Krishnamachari | |
| 2003/0066069 A1 | 4/2003 | Mankovich | |
| 2003/0101454 A1 | 5/2003 | Ozer et al. | |
| 2003/0110297 A1 | 6/2003 | Tabatabai et al. | |
| 2003/0231660 A1 | 12/2003 | Vinnakota et al. | |
| 2004/0098753 A1 | 5/2004 | Reynolds et al. | |
| 2004/0103026 A1* | 5/2004 | White | G06Q 30/0273 |
| | | | 705/14.69 |
| 2004/0117257 A1 | 6/2004 | Haberman et al. | |
| 2005/0086692 A1* | 4/2005 | Dudkiewicz | H04N 5/44543 |
| | | | 725/46 |
| 2005/0151756 A1 | 7/2005 | Miyamoto et al. | |
| 2005/0166224 A1* | 7/2005 | Ficco | H04H 20/106 |
| | | | 725/35 |
| 2005/0190794 A1 | 9/2005 | Krause et al. | |
| 2008/0242280 A1 | 10/2008 | Shapiro et al. | |
| 2013/0167139 A1* | 6/2013 | Arcilla | G06F 9/44505 |
| | | | 717/175 |

FOREIGN PATENT DOCUMENTS

| | | |
|---|---|---|
| JP | 2001-197381 A | 7/2001 |
| JP | 2001-242842 A | 9/2001 |
| JP | 2002-009691 A | 1/2002 |
| JP | 2002-197381 A | 7/2002 |
| JP | 2002-281479 A | 9/2002 |
| JP | 2004-281479 A | 10/2004 |
| JP | 2004-348220 A | 12/2004 |
| JP | 2005-513831 | 5/2005 |
| JP | 2005-198204 A | 7/2005 |
| WO | 01/77939 A1 | 10/2001 |
| WO | 02/21839 A2 | 3/2002 |
| WO | 02/28102 A1 | 4/2002 |
| WO | 2004/023437 A2 | 3/2004 |

OTHER PUBLICATIONS

U.S. Appl. No. 10/192,192, filed Jul. 9, 2002, entitled System and Method for Seamless Switching of Compressed Audio Streams.

* cited by examiner

SYSTEMS AND METHODS FOR MEDIA PACKAGING

CROSS-REFERENCE TO RELATED APPLICATIONS

This application is a continuation application of U.S. patent application Ser. No. 15/820,733, filed Nov. 22, 2017, which is a continuation application of U.S. patent application Ser. No. 14/217,167, filed Mar. 17, 2014, issued as U.S. Pat. No. 9,854,281 on Dec. 26, 2017, which is a continuation application of U.S. patent application Ser. No. 12/235,556, filed Sep. 22, 2008, issued as U.S. Pat. No. 8,677,397 on Mar. 18, 2014, which is a non-provisional of and claims the benefit of U.S. provisional Application No. 60/973,982, filed Sep. 20, 2007.

FIELD OF THE INVENTION

The invention relates generally to packaging media and data in a media delivery system, and more particularly, to the packaging process and apparatus useful in creating and delivering customized advertising.

BACKGROUND OF THE INVENTION

Systems have been developed for customized addressable video advertising. The systems are implemented mostly in traditional TV distribution networks (Cable, Satellite, and Broadcast). A typical system is illustrated in FIG. 1.

Referring to FIG. 1, a creation function 10 generally refers to the process of defining and setting up a customizable campaign. This process is generally supported by media tools (for example, storyboarding tools, editing tools, and other production and post-production tools) as well as data tools (for example, segmentation tools, analysis tools, etc.). The output of this process over line 12 is a campaign, consisting of produced media (typically in a high quality format, such as DV50), graphics, timing information, segmentation/targeting data, and all other metadata required to create different versions of the commercials and deliver them to the appropriate audience. The creation process of FIG. 1 generally takes place once, before the campaign starts to go on-air, and the different commercials are stored in an intermediate cache server.

A management function 14 generally refers to the process of monitoring and managing the campaign while it is on-air. This can include changing metadata, changing how certain versions of the commercial air under different circumstances, changing some of the price information in the commercial, etc. The process of managing a campaign can continue throughout the whole period that the campaign is on-air (whereas the creation process 10 is, as noted above, typically mostly done before the campaign starts to air). The management function output is available on lines 16.

A packaging process 18 generally refers to the process of combining all media and (meta-) data into single "assets" (sometimes referred to herein as "packages"). This process covers all the manipulation of media and data that is necessary to create single assets that can be easily distributed through delivery networks and then transformed into the final commercials that need to be displayed. It can cover process steps such as computing and rendering graphics over video, encoding audio and video into the formats required by the destination networks, matching of targeting data against delivery points, etc.

The packages (for example, the single assets that represent the media and data associated with a campaign) are output by the packaging control 18 over a line 20 and are distributed to its destination(s) through a delivery network 22. This can be any computer network that meets bandwidth and security constraints required for this application. It is typically a point-to-multi-point connection (in other words, packages arc typically sent from one place to many destination points (for example, to different cable systems, different satellite operators, or even different individual set-top boxes in a TV distribution network)). Different delivery networks typically have some unique features and/or constraints that are the result of their own unique architecture (for example, in a Broadcast Environment the same video signal is broadcast and shown to all viewers, in a Video-On-Demand environment every viewer sees their own unique copy of the video signal, etc.).

A de-packaging process module 24 receives the data from the delivery network 11 over a line 26 and generates the correct version(s) of the commercials for display at a specific times for a specific (group of) viewer(s). This process takes place in, or at the edge of, the Delivery Network 22 (for example, in a Video-On-Demand server, or in a Broadcast Facility). The de-packaging process generates a commercial that can immediately be displayed to a viewer, so it typically needs to be in a specific format depending on system and location (for example, MPEG-2 with specific encoding settings in the case of a modern cable system). De-packaging is a fully automated process (that is, it happens without human intervention) and happens prior to the time when the commercial is to be viewed. The unpackaged commercials are then sent and stored in an intermediate cache server 25 from the de-packaging module 24 over a line 28.

A display module 26 then receives the commercial to be displayed over lines 29 as needed, and generally renders the commercial to the viewer. This is typically performed using existing display systems. Depending on the network and implementation, this can be done using a Flash Player (in case of a Broadband application), using a digital set-top box (in case of a modern cable system), etc. It is important to note that the specific network/player/set-top box typically imposes certain specific formatting constraints on the commercial (for example, it needs to be in .flv file format for Flash Player, specific MPEG-2 flavor in case of set-top box, etc.).

Accordingly, it is important to be able to de-package quickly and efficiently in order to reduce delay times and increase efficiency and throughput in the system. It is also important to minimize the bandwidth required by the packages.

SUMMARY OF THE INVENTION

The invention relates to a method for packaging media and data for transmission over a broadband communications network link for display at a terminal destination. Features of the method included creating desired media segments for transmission to the terminal destination and for creating targeting information, for example in whole or in part in the form of metadata, for transmission to the terminal destination. Other features include packaging the created media segments and the created targeting information in a single package and unpacking the single package for display of the targeted media at the terminal destination in accordance with the targeting instructions.

In another aspect, the invention can provide a method for unpacking media and data for display at a terminal destination implementing, in accordance with the targeting instructions, receiving a single package containing media segments and instructions regarding handling of the media segments, unpacking the media segments and the instructions from the single package and assembling one or more of the media segments for display at the terminal destination.

The invention can further feature the media segments including audio and video segments wherein the audio segments are concatenated, the video segments are concatenated, the concatenated audio and video segments are combined, and the combined concatenated segments are forwarded for display at the terminal destination.

Further features of the invention include using an optimizing procedure during the packing to optimize the size of the package, where the media segments are segments of an advertisement and the terminal destination is a user's set-top box, and where the unpacking takes place on demand.

DESCRIPTION OF THE DRAWINGS

Features and advantages of the invention will be apparent from the drawings in which.

DESCRIPTION OF PARTICULAR EMBODIMENTS

Figure 1:
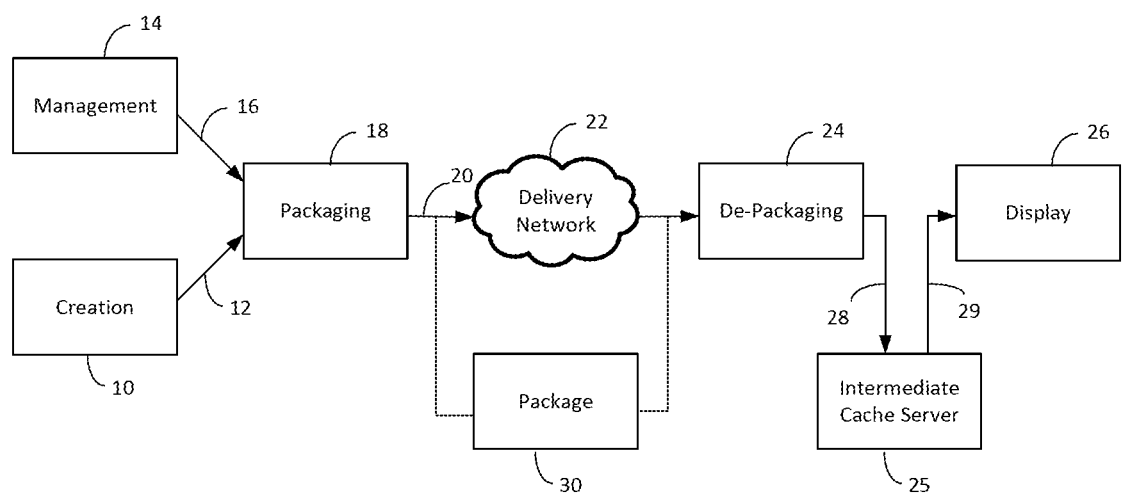
FIG. 1 represents a description of a prior art system at a high level.

In accordance with an embodiment of aspects of the invention, the system relates to a single package that contains all media and data that is needed to be able to generate a correct commercial version of a required presentation (preferably in real-time or on-demand). Such a package is self-contained, and allows for automatic generation of the correct presentation, for example, a commercial in each given presentation context. This embodiment has a number of important advantages.

First, the packages are self-contained, so they can be distributed and managed as single assets (there is no need to manage rules, metadata, and media assets separately). Second, packages are size-optimized; that is, unique asset pieces are only included in the package once (for example, if a campaign has a 15 second commercial with 1000 different versions, but the only difference is in the last 3 seconds, the package will contain the first 12 seconds only once; this is much more efficient than storing and distributing 1000 completely separate copies of the commercial). Third, because the package contains all rules and meta-data, the existing networks and other infrastructure do not have to worry about it. The knowledge of the rules and metadata is largely kept within the package, and is transparent to the networks and other system components. This localizes the complexity of dealing with changed data, content, or rules and allows the de-packaging to be performed at the destination of the media, for example, for set-top box. In the ideal situation, de-packaging is performed at the same time that the commercial airs (this is sometimes called "real-time de-packaging" or "de-packaging on-the-fly").

Applications

The concept of packages and packaging can be applied to many different TV network environments, one example being Broadband. In a Broadband environment, an exemplary ad preparation system is used to customize and target commercials that are inserted into online content, and then streamed to the viewer. The system can be used to change video commercials based on location of the viewer (for example using an IP address to location mapping, or through other mechanisms), based on real-time data (such as weather), or any other (business related) condition.

Currently, a number of different compression formats are used in Broadband: Flash Video, Windows Media, and Apple's Quicktime. Accordingly, a package for Broadband will contain media elements in Flash, Windows Media, or Quicktime (or any other format that may be needed), as well as any targeting or other meta-data that is necessary for targeting and customizing the commercial.

Most broadband video systems use buffering to compensate for unreliable network connections. This introduces some end-to-end delay (the user selects the video to watch, then has to wait few seconds before the receiver buffer is sufficiently filled in order for play-out to start). In accordance with one embodiment of the system described here, there are generated videos (potentially) on-the-fly, and the amount of time it takes to generate the needed version of the commercial from the package (known as de-packaging) is added to the end-to-end start-up delay (that is, the viewer will now have to wait X+Y, where X is the amount of time it takes to de-package, and Y is the amount of time it takes to buffer sufficiently). The start-up time needs to be minimized, resulting in a requirement to make the de-packaging process as fast as possible.

Package Content

The format of the package file should be such that a de-packager program can parse it and (provided it has the right contextual parameters) can very quickly generate a broadband video (for example, a commercial) from it. Ideally the performance (speed) of this function should be linear with the size of the package file (so it should be "order(n)" where "n" represents the file size of the package file). The package can typically contain 3 logical blocks of information, an index table, media assets, and an assembly table.

The index table is basically a lookup table for all the media assets that are in the package. For example an index table may indicate that there are 3 Flash video assets (A, B, C) and 4 MP3 assets (D, E, F, and G) is the package.

The media assets may be separated into video assets, audio assets, and graphics or other assets. Each type of asset is typically encoded in a specific format (for example, Flash video for video, MP3 for audio, etc.)

The assembly table contains information about when and how the various assets should be combined to produce the best (commercial) message for a given situation. Depending on the implementation, these could be fairly basic, for example it could specify that the "Spanish version" of the commercial can be generated by concatenating Flash video assets A, C, and X, and MP3 assets X, Y, and Z, and then combining video and audio in to a single .flv file. It could also specify (in case late-stage graphics overlays are supported), that graphics asset G should be over-layed onto the last part of the commercial message. In more sophisticated implementations, the assembly instructions can also include targeting information or trafficking information. For example it could also specify that all IP addresses in a certain range (say 123.4.5.678 to 123.4.5.670) should receive a specific version of a commercial, or that every Sunday between 10-11 am two different versions of the commercial message should be rotated 50%-50%.

Clearly there are different implementation options for the package format. One example is described in more detail below.

Figure 2:
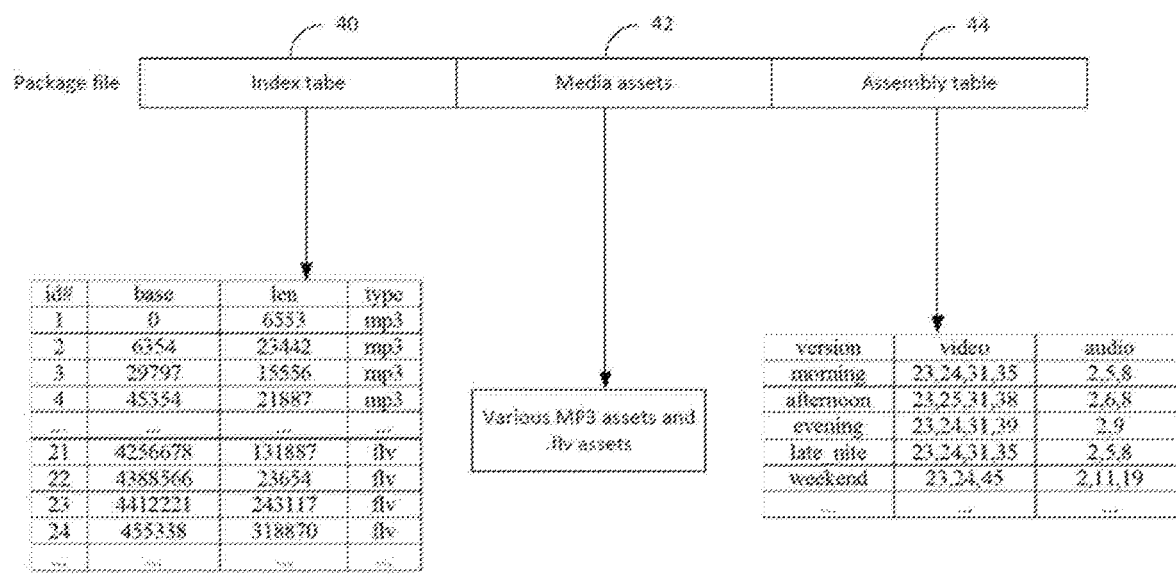
FIG. 2 illustrates an exemplary package implementation in accordance with one embodiment of the invention.

In this example, the package is implemented as a file as follows:

Referring to FIG. 2, there is depicted the logical structure of a package file, but not the formal file syntax. Thus, for example, fields like checksums, lengths of various segments, etc. are left out of the figure for reasons of simplicity and clarity in describing this exemplary embodiment of the invention.

The illustrated index table section 40 in FIG. 2 lists all the media assets that are available in the file. In this example only MP3 audio fragments, and .flv (Flash Video) video fragments are supported. The table contains an entry for each fragment. Each entry defines a unique media id (id #), a base offset pointing to the start of the media fragment in the file relative to beginning of media assets section (base), the length of this fragment in the file (len), and a type field that can either be mp3 (for audio) or .flv (for video).

The media assets section 42 contains all the actual media fragments (in this case mp3 or .flv fragments). In order to meet the performance requirements for ultra-fast de-packaging, the media assets need to be prepared/encoded in such a way that they can be simply concatenated together to produce a valid, seamless commercial without any audio- or video-artifacts.

The assembly table section 44 lists all valid commercial versions that can be generated from the file. In this example, there are some versions that are time/day specific (one version is valid in the morning, one in the afternoon, etc.). The assembly table contains an entry for each valid commercial version. Each entry defines a unique version name (version), as well as the identity of a sequence of video fragments that should be concatenated (video), and the identity of a sequence of audio fragments that should be concatenated (audio), It should be noted that in this example, the targeting conditions (which are all time-specific) are implicit and driven by the unique names of the versions (for example, the meaning of "morning" may be hard-coded to mean "midnight to noon EST on a work day", etc.). It is easy to see that the package file format could be further extended to also represent these rules (either time-based rules, or IP address based rules, etc.). This could, for example, be performed by extending the assembly table, or by introducing (adding) another table to associate "versions" in the assembly table 44 with specific targeting rules.

The Packaging Process

Figure 3:
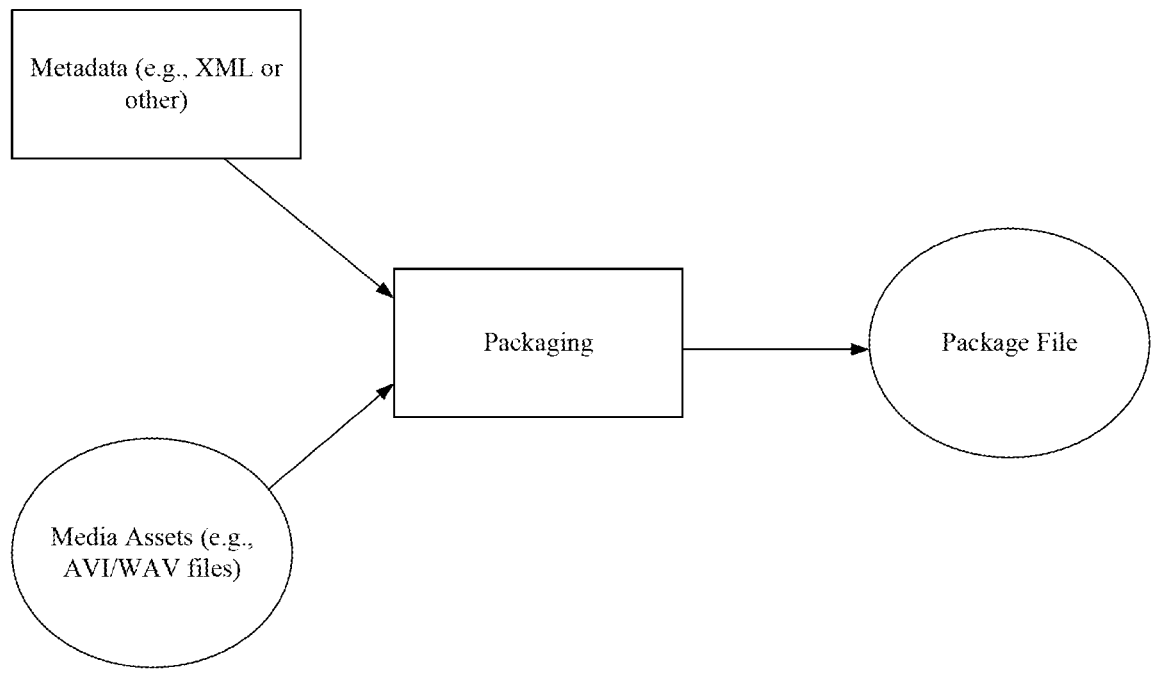
FIG. 3 illustrates inputs to a packaging process and the output therefrom in accordance with an embodiment of the invention.

The inputs and outputs of the Packaging process are illustrated in FIG. 3. Metadata is an input to the process. It may be represented as one or more XML files, but other (file or non-file) representations are possible too. It identifies the source media assets, and also contains metadata and rules to define which valid combinations of media assets should be used to generate different versions of the commercial. It may also contain some definition of the targeting rules for these sequences.

Media assets are an input to the process as well. They are typically of high (production-) quality, and could be in the form of .WAV files for audio and .AVI files for video.

The output of the process is a single package. While implementations can differ, the remainder of this description assumes the implementation is represented as a simple binary file.

It should also be noted that it is possible to implement the concept of a base package and update packages. A base package is created first to contain all media and metadata. It is then distributed into the delivery networks for airing. If changes in the campaign are required (different media, different rules), the packaging process can generate an update package, which only contains the changes since the base package. This has the benefit that all the data that was already distributed does not have to be re-distributed again. This assumes that the packaging process and the de-packaging process both have the concept of history (namely of the base package).

Media Packaging

One requirement to de-packaging is performance (that is, it should be possible to generate the correct version of a commercial from a package very quickly). In order to do this, it is important to reduce the amount of processing and media manipulation at de-packaging time. This can be accomplished by already encoding all media fragments in their destination-format during processing, so that at de-packaging time the fragments can simply be concatenated to produce the correct version (potentially there are some other basic operations, such as time-stamping, or some other simple operations that need to be done as well, depending on exact compression format; however the goal is to avoid computing-sensitive operations such as media manipulation, de-compression, re-compression, etc.).

Figure 4:
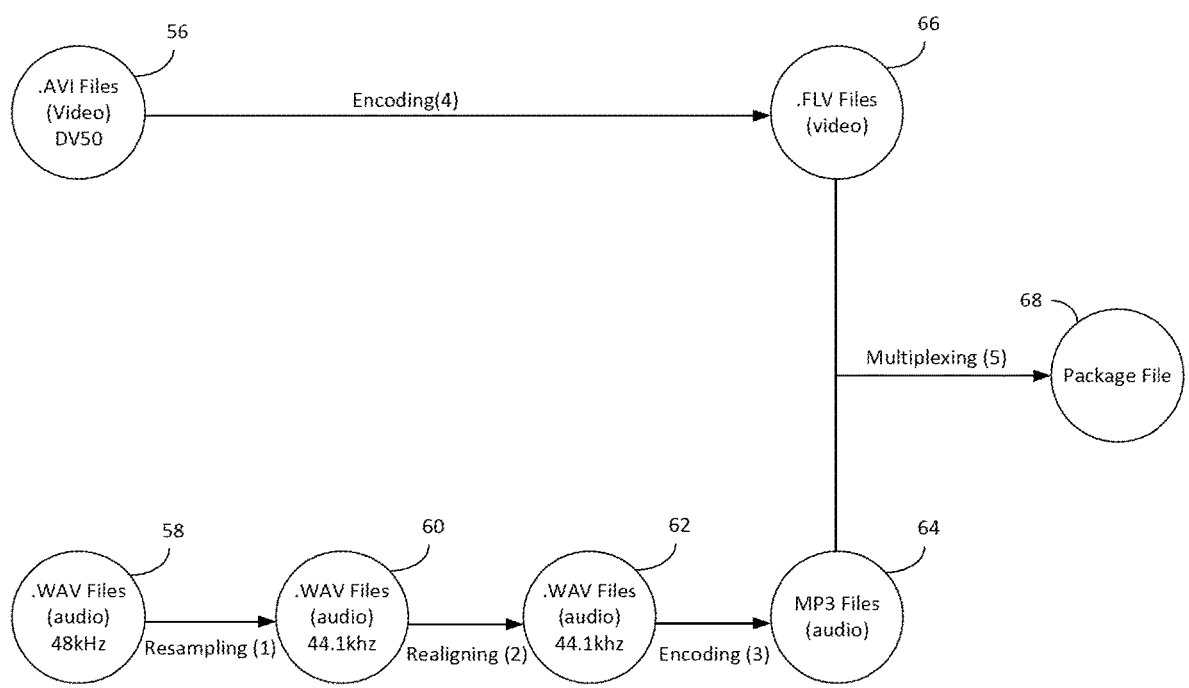
FIG. 4 illustrates a media packaging process implementation according to an embodiment of the invention.

FIG. 4 illustrates a more detailed example implementation of the media packaging process which helps improve de-packaging performance. In this example, the inputs are .AVI files (containing DV50 for video) 56, and .WAV files (with uncompressed audio having a sampling rate of 48 kHz for audio) 58. In this example flow we are leaving out template and metadata flow for reasons of simplicity. The audio inputs are uncompressed audio, sampled at 48 kHz, in .WAV files.

Because this packaging process is for Broadband Flash files, MP3 files having a different sampling frequency (44.1 kHz), are needed. The system then resamples all audio fragments to 44.1 kHz (resampling (1)) 60. There are various techniques for resampling that are used in the industry today, which are known in the field and will work in this context.

Once the audio fragments have the correct sampling rate (still uncompressed audio in .WAV files), they need to be re-aligned (realigning (2)) 62. This step is required to make it possible for separately encoded audio fragments to be seamlessly concatenated together. It is described in detail in U.S. patent application Ser. No. 10/192,192, entitled "System and Method for Seamless Switching of Compressed Audio Streams", the contents of which are incorporated herein, in their entirety, by reference.

Once realigned, the fragments can be encoded to the correct compression format, in this case MP3 files (encoding (3)) 64. This can be done with any adequate MP3 encoder, however for MP3 encoders, in order to keep frame boundaries clean, the "bit reservoir" option should be disabled. This step results in a set of separately encoded MP3 audio files at 64.

The video inputs, in this illustrated example, are video fragments, compressed at DV50 (50 Mbit/sec). They are encoded to the right video compression format, in this case .FLV files (encoding (4)) 66. This can be performed with any adequate FLV encoder. The result is a set of separately encoded FLV video files.

The encoded audio files (MP3) and the encoded video files (FLV) are then multiplexed into a package file (multiplexing (5)) 68. The package file format could be, for example, be the format as described in FIG. 2. It should be noted that in this step metadata also are entered into the package (for example in the 'assembly table' section of the package file).

Figure 5:
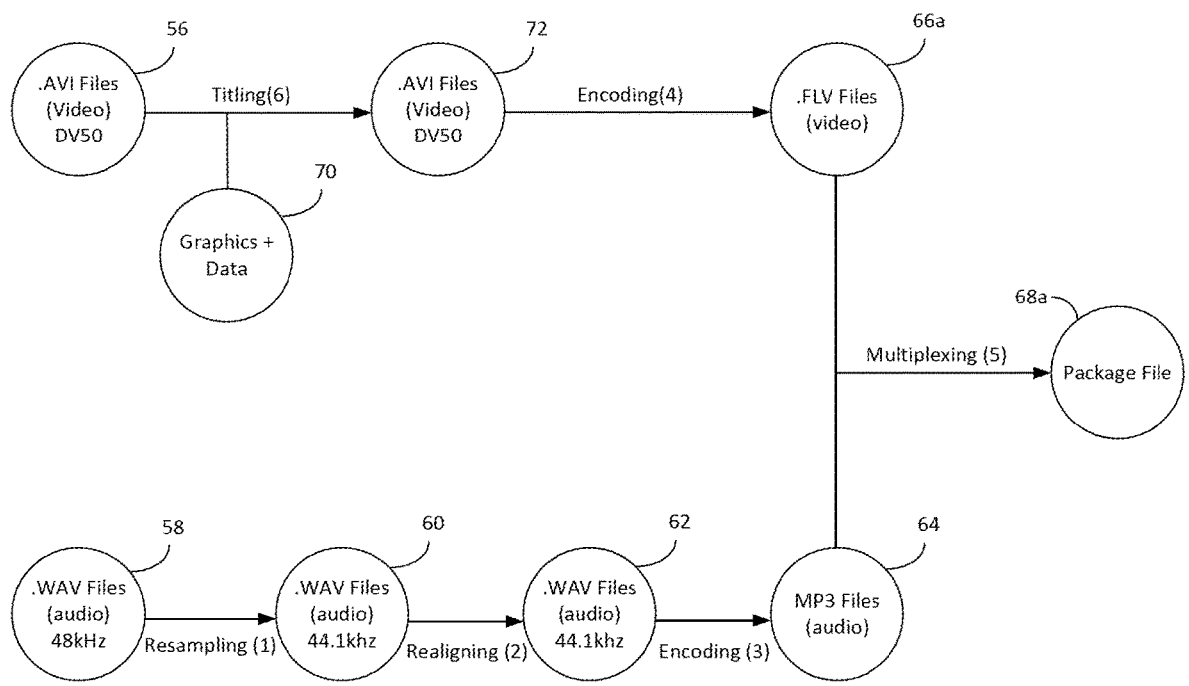
FIG. 5 illustrates another media packaging process implementation according to an embodiment of the invention.

The packaging process of FIG. 4 can be extended to add more functionality, or different media types. A somewhat more sophisticated example of such a packaging process is illustrated in FIG. 5. Referring to FIG. 5, a process, almost identical then the process described in FIG. 4, with the addition of graphics overlay, is illustrated. In this example, there are additional inputs into the system in the form of graphic files+data at 70. The graphic files can design templates for graphics overlays (or art cards). The data can be actual values for the graphics that need to be part of the final commercials. For example, there could be a graphics template for a dealer address in a car commercial, and the data could be a spreadsheet with a list of all valid dealer addresses.

Before the video fragments are encoded (encoding (4)) to form the FLV files at 66a, the system will make copies of the appropriate video fragments, compute the various graphics content for each fragment, and render them into the video 72. So, for example, if the last 5 seconds of the commercial need to include dealer address, and there are 5 dealer addresses, the system will make 5 copies of the last 5 seconds of video, render dealer address 1 into copy 1, dealer address 2 into copy 2, etc.

Packaging Metadata

Metadata is another element of a package file. In the package file format of FIG. 2. the metadata is part of the assembly table. In other implementations, it can also be in a separate section.

Figure 6:
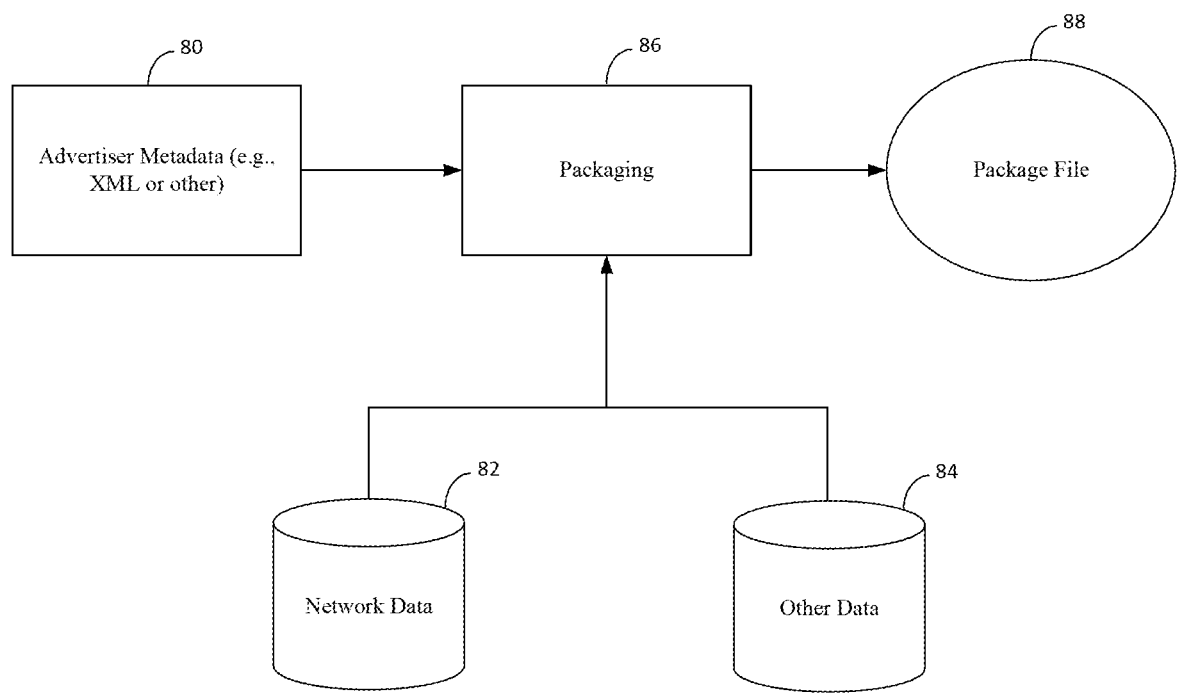
FIG. 6 illustrates a data packaging process implementation according to an embodiment of the invention.

FIG. 6 illustrates an exemplary implementation of the metadata packaging process. Note that the media packaging process and metadata packaging process are highly interrelated. An implementation of a packaging process could include media packaging as described above, combined with metadata packaging as described below.

Referring to FIG. 6, advertiser metadata 80 is campaign specific, and can be supplied as XML files or other representations. It defines business rules (or data segmentation) and links them to the media. It can define business rules referring to any data segmentation methodology, provided that there is enough data in the packaging process to resolve the method against delivery addresses. An example of advertising metadata is illustrated in the table below where the first column refers to the media/commercial, and the second column defines target audience:

| Version | Target |
| --- | --- |
| version_A | Boston |
| version_B | San Francisco |
| version_C | New York |
| ... | ... |

In this example, version_A of the commercial should be shown to people living in Boston, version B to San Francisco, etc.

Network Data 82 is data that describes the network topology and network addresses that are available for the delivery of the commercial messages. It will typically be represented as a database table. The content of the database depends on the delivery network, that is, for example, the database for cable systems is different than the database for the Internet. An example of a network configuration for Internet delivery is illustrated in the table below where the first column represents IP address ranges, and the second column defines zip code range:

| IP | ZIP |
| --- | --- |
| 100.200.300.X | 11111-11116 |
| 101.2.3.4-101.2.3.9 | 22222 |
| ... | ... |

Other data 84 is any other database that is needed to resolve the resolution between advertising metadata (in this example: versions) and delivery points in the particular network, for example, IP addresses. An example of other data is illustrated in the table below where the first column defines target audiences/cities, and the second column defines ZIP codes:

| Target | ZIP |
| --- | --- |
| Boston | 20001-20100; 21010 |
| San Francisco | 31000-33000 |
| New York | 10000-19999 |

This packaging process 86 will take the input advertiser metadata 80 and resolve it against network data 82 and other data 84 where needed. More specifically, the packaging process will establish the link between different versions of the commercial on one hand, and the physical delivery addresses that are present in the network. The purpose of this is to make sure that if a commercial version is requested (deep inside the delivery network), the de-packaging process can be executed very quickly, preferably without need to query other data sources. In the example illustrated by the table below, the packaging process can compute the following data to be included in the package:

| Version | IP |
| --- | --- |
| version_A | 300.200.200.X; 310.202.33.12 |
| version_B | 100.200.200.X |
| version_C | 140.X.213.122 |
| ... | ... |

In the table, the first column defines the version, and the second column defines for which IP addresses this version is applicable. This data is then embedded into the package file 88 (as part of the assembly table, or separately), so that at de-packaging time all required media and data is available for quickly generating the correct version of the commercial for a given IP address.

De-Packaging

In accordance with the invention, the de-packaging process takes place at a point in the streaming process where the stream to the end user/display becomes unique. At that location, de-packaging occurs substantially on-demand, thus requiring that the de-packaging process be simple so that it can be performed as the media/commercial is needed.

As noted above, performance is an important criterion for the de-packaging process. In general the de-packaging process determines the targeting criteria from its environment (for example, from which IP address a certain commercial is requested), and it finds the media fragments, concatenates them, and multiplexes them into a file in the correct file format. An example of a more detailed de-packaging flow is illustrated in FIG. 7.

Figure 7:
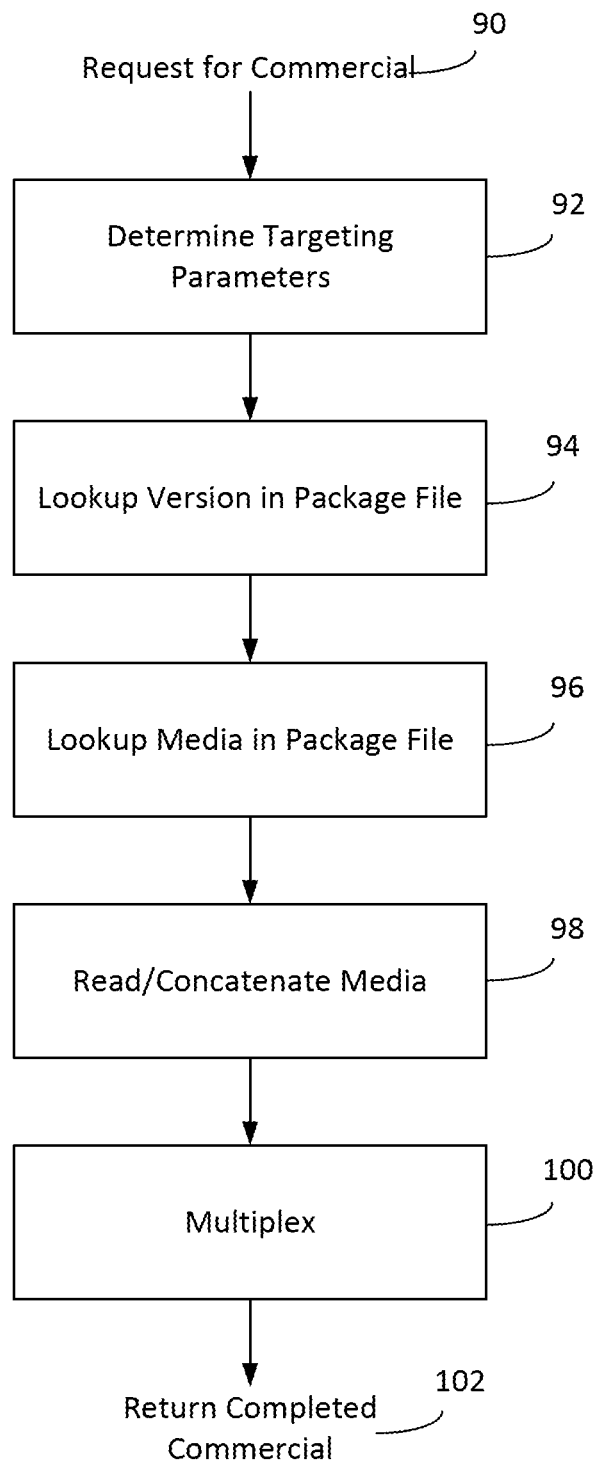
FIG. 7 illustrates a de-packaging process implementation according to an embodiment of the invention.

Referring to FIG. 7, a request for commercial 90 is typically initiated through the delivery network. This request is then passed to the de-packaging process. This could be a request for a broadband commercial on the Internet, or it could be a request for a commercial in a Video-On-Demand session, etc.

The de-packaging process will first determine targeting parameters 92. These are the parameters that should be used to generate the correct version of the commercial. These parameters should be passed with the request to the de-packager. In an Internet environment this could be the IP address of the target computer. In a Video-On-Demand system it may be the MAC address of the destination set-top box.

The de-packaging process will use the targeting parameters to lookup the version in the package file at 94. This will typically be looked up in the assembly table, or in another section of the package. The result of this step is a unique identifier of the version.

The next step at 96 looks up the media in package file. This is performed using the index table in the package file. The result of this step is a list of pointers to the various media fragments in the package file that need to be concatenated.

The next step at 98 reads/concatenates the media. The various audio fragments are read in sequence, and the various video fragments are read in sequence. The result is a single video stream and a single audio stream.

The final step 100 is to multiplex the audio and video streams. This step multiplexes the audio- and video-packets (in the right order and ratio) into a single sequence. This process may also include minor adjustments in the packet headers (or re-stamping timestamps) in order to make the resulting single file seamless and correct.

The resulting file is then return to the caller at 102.

While one primary application of the illustrated packaging/de-packaging process (namely that individual media elements and targeting data are packaged together in a single asset, and are pre-prepared to enable simply and quick extraction of completed commercials in real-time) is illustrated in detail there are alternative implementations and applications of this technology. Thus, it can be applied to different audio- and video-formats, such as: Flash Video, Windows Media, Quicktime, MPEG-2 Standard Definition, MPEG-2 High Definition, 1-1.264, etc. It can also be applied to different rich media formats, such as: Flash, animated GIF, animated JPEG, etc. Further, it could be used to create targeted/customized commercials and "embed" them as single assets into Content Distribution Networks (such as Akamai), or into streaming servers (such as Flash Streaming Server). This would allow targeted campaigns to be distributed as streams just like regular commercials. Additionally, it could be used in "On-Demand: (or Unicast) digital TV networks (Video-On-Demand in Cable, 1PTV, Switched Digital Video in Cable, etc.). This would make it possible to extract the correct commercial almost on-the-fly once the viewer is known). It could also be used for video messages other than commercials (so, for example, it could be used to create personalized news clippings, or other content). In other implementations, various performance optimizations are possible. For example, it is possible to create a de-packager that can be invoked once for multiple targets, and it would return multiple relevant video commercials in one run.

Other features and advantages of the invention will be apparent to those practiced in the field, and are considered to be within the scope of the invention.

The invention claimed is:

1. A non-transitory computer-readable medium storing instructions that, when executed, cause:
   collecting a plurality of media segments for transmission to a device, each of said media segments comprising a fragment of a content message;
   creating targeting information for transmission to said device, said targeting information defining a plurality of versions of said content message formed from two or more of the plurality of media segments and a target segment audience;
   packaging said plurality of media segments and said targeting information defining the plurality of versions of said content message in a single file; and
   transmitting the single file and instructions to unpack said single file, the instructions being configured to instruct said device to determine which one of the plurality of versions of said content message to assemble based on the target segment audience, assemble one or more of the collected plurality of media segments to generate said content message, and present for display said assembled content message at said device in accordance with said targeting information.

2. The non-transitory computer-readable medium of claim 1, wherein said unpacking occurs on-demand.

3. The non-transitory computer-readable medium of claim 1, wherein the instructions, when executed, further cause using an optimizing procedure during said packaging to optimize the size of said package.

4. The non-transitory computer-readable medium of claim 1, wherein said media segments are segments of advertisements.

5. The non-transitory computer-readable medium of claim 1, wherein said device is a set-top box.

6. The non-transitory computer-readable medium of claim 1, wherein said packaging comprises:
   creating a plurality of first video files in a first format;
   creating a plurality of first audio files in a second format;
   converting said first video files to a third format compatible with use at said device;
   converting said first audio files to a fourth format compatible with use at said device; and
   multiplexing said converted files into a packaging file for transmission to an intermediate cache server.

7. The non-transitory computer-readable medium of claim 6, further wherein said unpacking comprises:
   de-packaging, at said intermediate cache server, said transmitted package file to generate video media and audio media assets;
   concatenating said audio and video assets at said intermediate cache server; and
   outputting from said intermediate cache server said concatenated files to a unique signal path to the device.

8. The non-transitory computer-readable medium of claim 6, wherein said third and fourth formats are formats directly usable by said device.

9. The non-transitory computer-readable medium of claim 1, wherein said unpacking occurs at said device.

10. A non-transitory computer-readable medium storing instructions that, when executed, cause:
  receiving over a network a single file containing a plurality of media segments comprising a fragment of a content message and targeting information defining a plurality of versions of the content message formed from two or more of the plurality of media segments and a target segment audience for each of the plurality of versions of the content message;
  unpacking said plurality of media segments and said targeting information defining the plurality of versions of said content message from said single file;
  identifying one of said plurality of versions of said content message based upon said targeting information; and
  assembling said one of said plurality of versions of said content message from two or more of the plurality of media segments using said targeting information into an assembled content message for display at a device.

11. The non-transitory computer-readable medium of claim 10, wherein said unpacking takes place on-demand.

12. The non-transitory computer-readable medium of claim 11, wherein said media segments include audio and video segments, and said assembling comprises:
  concatenating audio segments;
  concatenating video segments;
  combining the concatenated audio and video segments; and
  forwarding the combined concatenated segments for display.

13. A non-transitory computer-readable medium storing instructions that, when executed, cause:
  collecting a plurality of media segments for transmission to an intermediate cache server from which a unique transmission path exists to a device, each of said media segments comprising a fragment of a content message;
  creating targeting information for transmission to said intermediate cache server, said targeting information defining a plurality of versions of said content message formed from two or more of the plurality of media segments and a target segment audience;
  packaging the collected plurality of media segments and targeting information defining the plurality of versions of said content message at a source location into a single file;
  transmitting said single file from said source location to said cache server over a broadband network link; and
  transmitting instructions to de-package said single file at said intermediate cache server on-demand, the instructions being configured to instruct said device to determine which one of the plurality of versions of said content message to assemble based on the target segment audience, assemble one or more of the plurality of media segments to generate said content message, and present for display said assembled content message at said device in accordance with said targeting information.

14. The non-transitory computer-readable medium of claim 13, wherein the instructions, when executed, further cause preprocessing said media segments prior to said transmitting for enabling on-demand de-packaging of said single package at said intermediate cache server.

15. The non-transitory computer-readable medium of claim 14, wherein said preprocessing comprises converting said media segments at said source to a format compatible with a format required at the device.

16. The non-transitory computer-readable medium of claim 13, wherein said packaging comprises creating a package file having at least an index table, media assets, and an assembly table.

17. The non-transitory computer-readable medium of claim 16, wherein said index table comprises at least pointers to the location and lengths of identified media segments in the package file and their type.

18. The non-transitory computer-readable medium of claim 16, further wherein said assembly table comprises at least instructions regarding a concatenation of media segments for display in different demographic episodes.

19. The non-transitory computer-readable medium of claim 18, wherein said demographic episodes are time periods.

* * * * *